Figure 1:
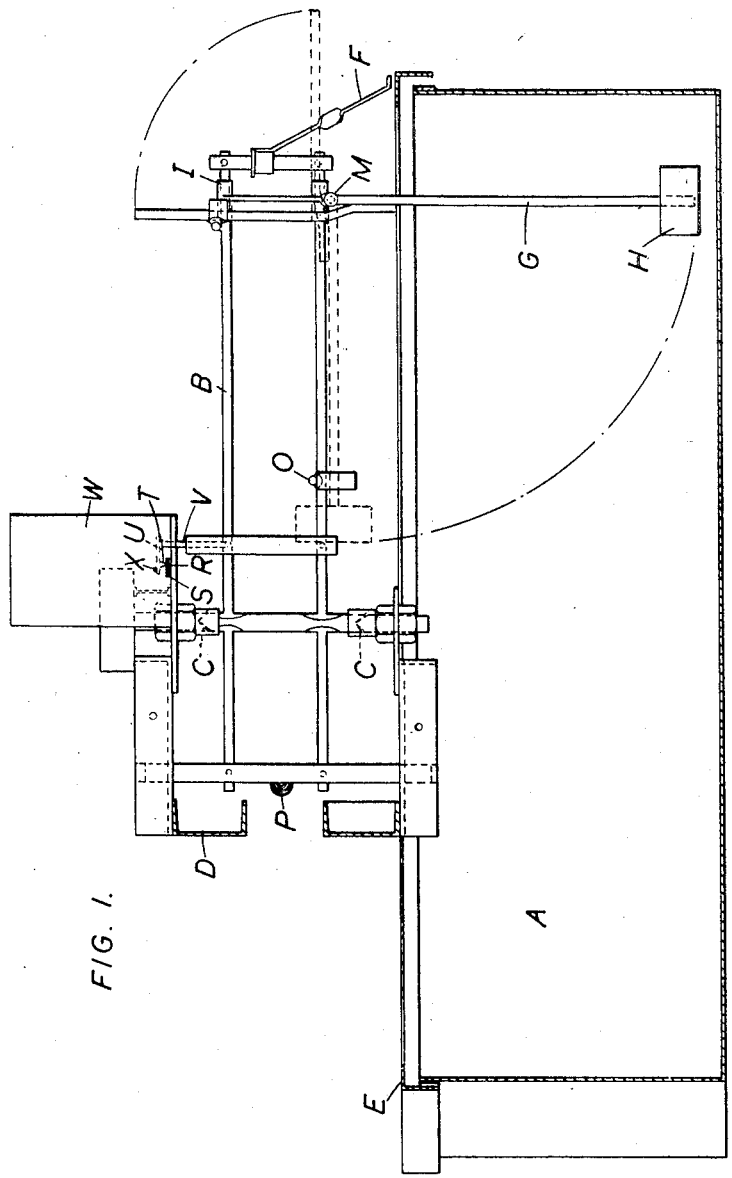

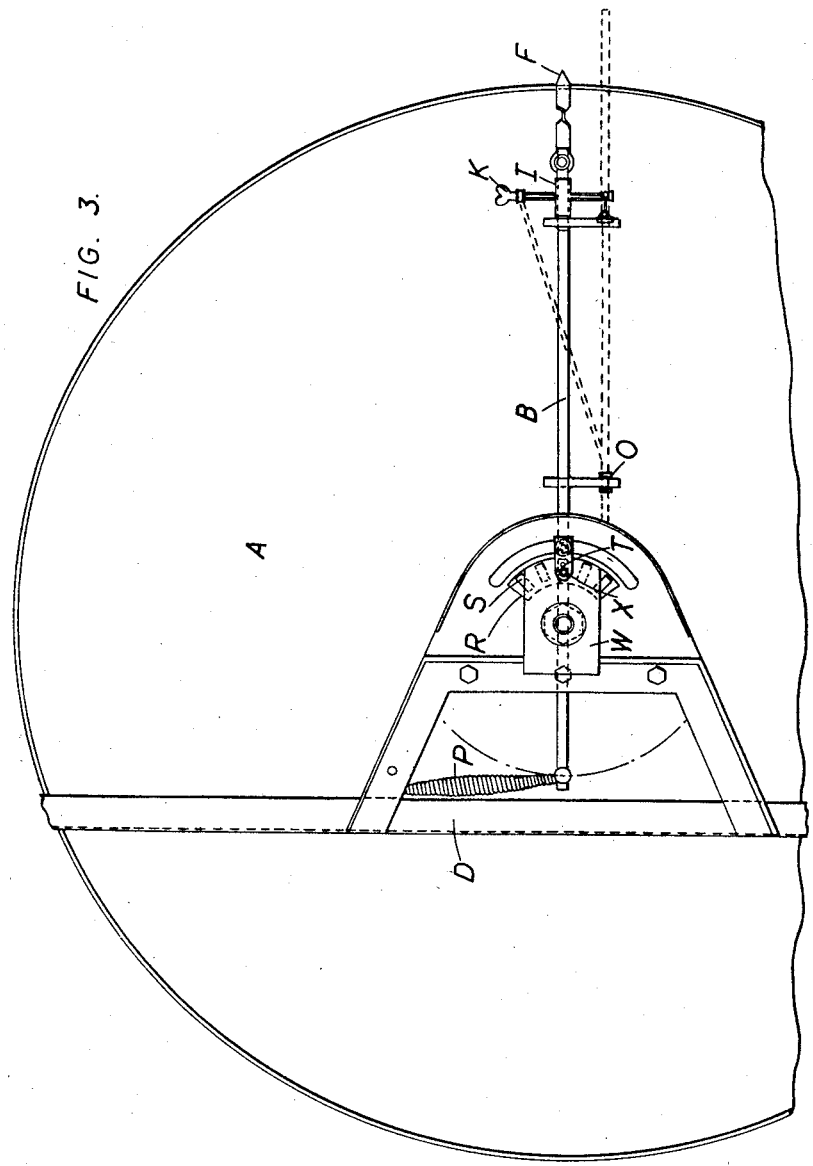

Patented Feb. 24, 1953

2,629,790

UNITED STATES PATENT OFFICE 2,629,790

APPARATUS FOR MEASURING AND/OR CONTROLLING THE CONSISTENCY OF A PASTE OR SLURRY

John William Laing, Mill Hill, London, and Peter Edward Starnes, Boreham Wood, England, assignors to John Laing & Son Limited, London, England Application October 7, 1950, Serial No. 188,922
In Great Britain October 7, 1949

2 Claims. (Cl. 200—52)

This invention relates to apparatus for measuring and controlling the consistency of a paste or slurry and it has for an object to provide a construction of apparatus for use with a revolving pan mixer whereby the consistency of the mix can be determined continuously during the actual mixing operation and without the necessity for removing samples and testing them from time to time.

A further object is to provide an apparatus whereby at certain preselected readings of the measuring device indicating a measure of the consistency a sequence of electric circuits can be closed automatically, thus permitting of automatic control of secondary operations in relation to the consistency of the mix.

In the present invention the consistency of the mix in a revolving pan is measured by the angular displacement by the slurry or paste moving in the pan against the action of the substantially constant opposing force of a spring of a surface supported in immersed or partly immersed condition in the slurry or paste and to this end there is mounted over the mixer a pivoted arm or frame from which depends into the mixing pan an arm carrying a blade or paddle the opposite end of the pivoted frame having attached thereto a spring opposing the angular displacement of the pivoted frame, a pointer in the frame indicating the displacement on a scale.

In accordance with a further feature a series of electrical contacts is so disposed in relation to a brush or the like carried by the pivoted arm or frame as to be contacted in turn by the brush as angular displacement of the arm whereby to control auxiliary devices.

Apparatus in accordance with the invention has applications in many different fields and in fact in any process in which the continuous estimation of the rheological properties of a paste, slurry or dough during the mixing period can be of advantage, provided that the mixing can be carried out in a suitable type of revolving pan mixer.

The apparatus is of particular advantage in the manufacture of chemically aerated cellular concrete from pulverised fuel ash in which case the water is used in order to obtain a slurry of a predetermined standard consistency from materials which vary in water content, fineness and carbon content from batch to batch and the circuit-making attachment is used to control the addition of the last few gallons of mixing water as the standard consistency is approached.

Without such a device accurate control is impossible unless the moisture content, fineness and carbon content of each batch are predetermined and the water requirement for the standard consistency calculated. Such a procedure would require the blending and storage of large quantities of raw materials and add enormously to both the capital cost and the production charge of the process.

Figure 2:
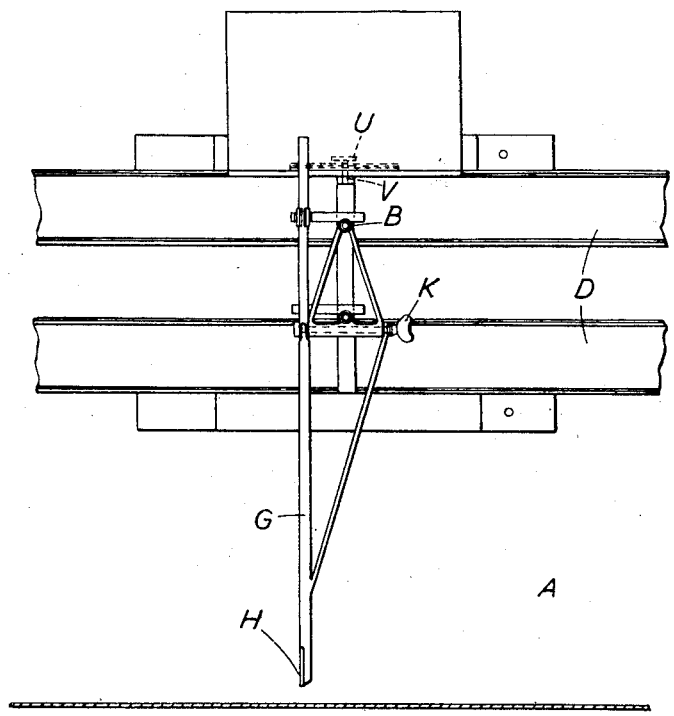

One embodiment of the invention is illustrated somewhat diagrammatically in the accompanying drawings in which Fig. 1 is an elevation with the blade or paddle shown in full lines in operative position and in dotted lines in inoperative position. Fig. 2 is a view at right angles to Fig. 1, the pan being omitted while Fig. 3 is a plan view.

Referring to the drawings, A indicates the ordinary revolving mixing pan driven by means (not shown) B is a swinging frame comprising a pair of superposed bars adapted to turn about cone bearings C' disposed centrally over the pan and carried by a fixed frame D secured above the mixing pan and E a stationary rail surrounding the rim of the pan and marked with a suitable scale. F is a pointer carried by the frame B and cooperating with the scale.

The pivoted frame B carries adjacent one end a braced arm G adapted on its operative position to depend at right angles to the frame B fitted at its end with a paddle or blade H adapted to extend into the slurry or paste in the pan A, the paddle arm being provided with sleeves I by which it may be moved along the parallel bars to adjust the distance of the paddle from the centre of the pan, set screws K serving to clamp the arm on the frame B in adjusted position. The length of the paddle arm G is such as to allow approximately ¾" clearance between the bottom of the mixer pan A and the underside of the paddle or blade H. The paddle arm G is hinged at M to the lower sleeve I so that it can either be locked by means of a clamp in the vertical position (shown in continuous line) or swung through 90° about the hinge M and held in the horizontal position (shown in dotted lines) by means of a catch O.

To an upright member of the swinging frame B is attached a closely wound helical spring P secured at the other end to the rigid frame D.

As the frame B is turned from the neutral position in an anti-clockwise direction by the mixture in the pan a restoring couple is applied by the spring P the magnitude of which is proportional to the deflection of the frame B from the neutral position, provided that the deflection is not greater than about 30° of arc. In practice the tension of the spring P the dimensions of the paddle H and the moment of the paddle H about the bearings are adjusted so that the instrument operates at a maximum deflection of approximately 20° of arc.

On an insulating base R carried by the fixed frame D are disposed on an arc of a circle a number of copper segments S. With these segments is adapted to cooperate a spring loaded brush T mounted on the end of an insulating arm U carried on a vertical support V.

As the frame B is rotated the brush T sweeps over the copper segments S and makes contact with each in turn. Each segment is connected to a separate terminal in the junction box W. The contact brush T is also connected to another terminal in the junction box W via an intermediate terminal X. Clearly such an arrangement can be used to close a number of electrical circuits in sequence as the frame B is turned.

In the above description it has been assumed that the mixer pan rotates in an anti-clockwise direction.

The apparatus operates as follows:

Assuming that the mixer pan to be full to a particular depth of a slurry of fine solids suspended in water, the paddle or blade is lowered into the mix and locked in the vertical position. Immediately a thrust is exerted on the paddle or blade which is due to the force transmitted by the slurry from the bottom of the revolving pan. The magnitude of this thrust will depend upon the rheological properties of the mix, principally the viscosity and the density. The effect of this thrust will be to displace the swinging frame B in an anti-clockwise sense until the restoring couple due to the spring P exactly balances the thrust. The swinging frame B will then be in an equilibrium position and the pointer F will register a steady reading upon the scale E. If more water is added to the mix the consistency will fall as it is mixed in; the thrust will be reduced and the pointer will register a new equilibrium position. In fact the meter can be used to give a continuous indication of the fall in consistency of the mix as water is added during the mixing period.

It has been shown that the reading will depend largely upon the viscosity and density of the mix and these two factors are those which determine the consistency of the mix from a technical point of view. Hence the reading of the meter is a satisfactory index by which to control the mixing process. It must be emphasized however that the consistency as measured is a synthesis of several rheological properties and that the units of measurement are entirely arbitrary and dependent on the design, dimensions and setting of the meter.

It is obvious that since the paddle arm G presents a small but definite resistance to the flow of the mix, the reading will also depend to some extent upon the depth of the mix in the pan. By making the area of the paddle or blade large in comparison with the diameter of the arm G, the effect of variation in depths of the mix can be rendered insignificant within fairly wide limits always provided that the paddle or blade is completely immersed.

We claim:

1. Apparatus for measuring and/or controlling the consistency of a paste or slurry in a revolving mixing pan comprising in combination with a frame mounted for pivotal movement about a vertical axis over the mixing pan, a spring opposing the pivotal movement in one direction of said frame, a fixed scale and a pointer on said frame disposed adjacent said scale, an arm hingedly supported on said frame adapted in one position to extend downwards into the slurry in the pan and in another position to be clear of the slurry in the pan, a paddle or blade mounted on said arm and in one position immersed or partly immersed in the slurry in the pan and means for clamping the said arm with the paddle in immersed or partly immersed position.

2. In apparatus as claimed in claim 1 means for controlling auxiliary devices from said frame, said means including a fixed base plate disposed above the pivot of the frame, a series of electrical contacts carried on said base plate, said contacts connected to separate terminals of said auxiliary devices and a brush carried by said frame and adapted on movement of the frame to make successive electrical contacts whereby to close different electric circuits.

JOHN WILLIAM LAING.
PETER EDWARD STARNES.

REFERENCES CITED

The following references are of record in the file of this patent:

UNITED STATES PATENTS

| Number | Name | Date |
|---|---|---|
| 905,588 | Root | Dec. 1, 1908 |
| 1,730,893 | Lichtenberg | Oct. 8, 1929 |
| 2,382,979 | Demb | Aug. 21, 1945 |